United States Patent
Izumitani

[11] Patent Number: 5,665,135
[45] Date of Patent: Sep. 9, 1997

[54] METHOD FOR FABRICATING PREFORMS FOR MOLDED LENSES

[76] Inventor: Tetsuro Izumitani, 685-58, Hodokubo, Hino-Shi, Tokyo, Japan

[21] Appl. No.: 278,134

[22] Filed: Jul. 21, 1994

[51] Int. Cl.$^6$ ............................................. C03B 19/00
[52] U.S. Cl. ............................ 65/66; 65/21.3; 65/37; 65/65; 428/542.8
[58] Field of Search .................. 65/21.3, 37, 65, 65/66, 102, 104, 111, 120; 264/320, 234; 428/542.8

[56] References Cited

FOREIGN PATENT DOCUMENTS

| | | | |
|---|---|---|---|
| 19342B1 | 5/1980 | European Pat. Off. | ......... C03C 3/16 |
| 61-29890 | 7/1986 | Japan | ......................... 65/111 |
| 61-232235 | 10/1986 | Japan | ......................... 65/102 |

*Primary Examiner*—Donald E. Czaja
*Assistant Examiner*—Michael P. Colaianni
*Attorney, Agent, or Firm*—Wenderoth, Lind & Ponack

[57] ABSTRACT

Optical glass of cubic, spherical or polygonal shape is fire polished on a graphite or $Cr_2O_3$, concave surface with a surface roughness of 100 Angstroms or less. The optical glass having a surface roughness of 400 Angstroms or less is placed on the concave surface and fire polished by heating the optical glass between the yield point and softening point of the glass in a reducing atmosphere if the concave surface is made of graphite. A $Cr_2O_3$ concave surface is required for $Pb^{+2}$ containing glasses. The molded preform obtained has a surface roughness of 100 Angstroms or less.

5 Claims, 2 Drawing Sheets

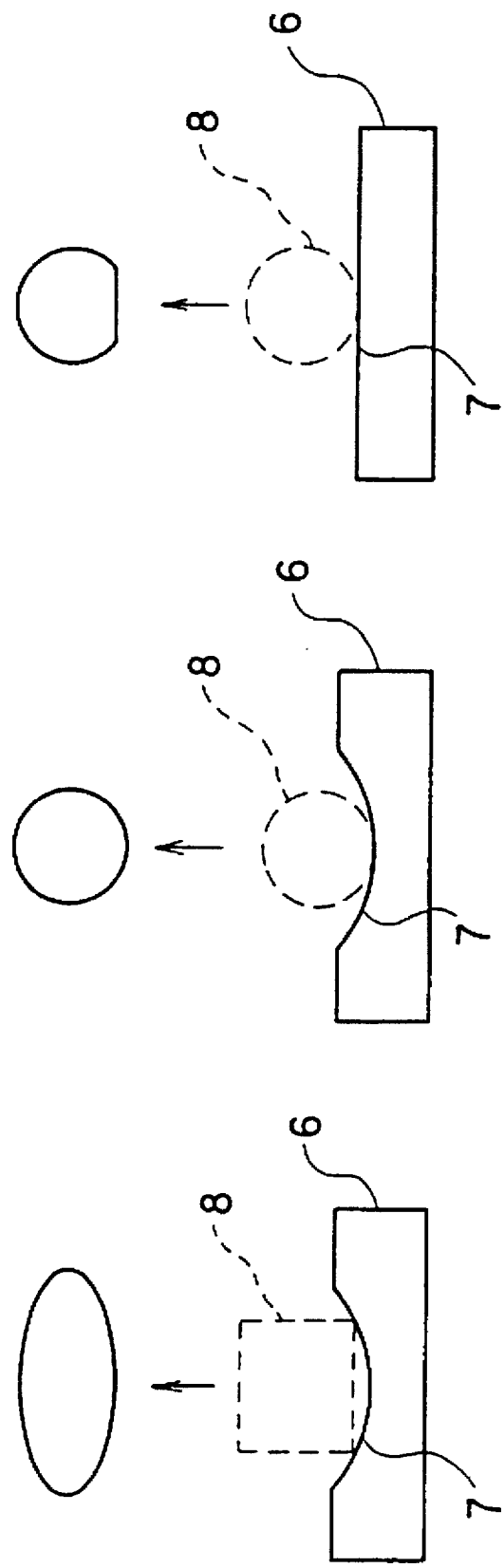

METHOD FOR FABRICATING PREFORMS FOR MOLDED LENSES

BACKGROUND OF THE INVENTION

1. Field of the Invention

The present invention relates to a method for fabricating a preform for molded lenses, and a preform fabricated by that method.

2. Description of Related Art

It was in 1987 that aspheric lens production was initiated by molding rather than by polishing.

According to one typical method for making such aspheric lenses, lens preforms having a surface roughness of up to 100 Å are pressed in a mold at a temperature lying within the viscous range of $10^8$ to $10^{12}$ poises for a period of at least 20 seconds, while the temperature of the glass is kept equal to the temperature of the mold (see JP-B 56-378).

The mold used must then be built up of material that does not fuse to glass. For instance, SiC with a carbon coat on it, $Al_2O_3$ with a chromium oxide coat on it and the like are used (see M. KOBAYASHI and T. OSHITA, "Tungalloy", 32, 43 (1992)).

It is here noted that the preforms for molded lenses are in (1) spherical, and (2) virtually oval forms, because they must be pressed at the center position of a lens mold. However, 1) the preforms should not only have a surface roughness equal to a polishing roughens of up to 100 Å), but also be free from surface defects such as shear marks, and
2) the preforms should have their weight variation limited to up to 0.5%, because their weight has a close relation to the final lens thickness.

To provide optical surface roughness and a constant weight to preforms for molded lenses, they may possibly be made by a method for making ordinary spherical lenses by polishing. However, this method is not economical in such a sense that molded lenses cost twice as much as polished lenses.

To solve this problem, those skilled in the art have come up with such a method as illustrated in FIG. 1. According to this method, a glass droplet 3 is formed at the distal end of a pipe 2 attached to the bottom of a crucible 1. Then, that distal end is cut 9 so that the glass droplet 3 can drop down from the lower end of the pipe 2 in a substantially spherical form. This droplet 3 receives hot air 5 injected out of a funnel pipe 4, so that it can be cooled without coming into contact with any object, thereby making a preform with no surface defect.

However, this prior method has some problems. That is, 1) the glass used should have surface tension high-enough to form the glass droplet 3 while it is well balanced between weight and surface tension.

Hence, the material used with the prior method is limited to glass species having high surface tension, e.g., SK and LaF.

2) Too large pipe diameter makes it difficult to form any spherical droplet having a certain or larger diameter (e.g., larger than 10 mm). Thus, the prior method is unsuitable for making a complete preform.

In view of such problems as mentioned above in connection with the prior art, an object of the invention is to provide a method for fabricating a preform for molded lenses, which is not limited by the surface tension of glass and so is applicable to every glass, and is not limited by glass size at all. Another object of the invention is to provide a preform fabricated by such a method.

The above and other objects and features are achieved by the invention set forth hereinafter.

SUMMARY OF THE INVENTION

1. A method for fabricating a preform for molded lenses, in which glass is formed into a spherical or oval preform by fire-polishing at a temperature between the flow-point (the viscosity of $10^5$ poises) and yield point (the viscosity of $10^{10}$ poises) of the glass.

2. A method for fabricating a preform for molded lenses, in which glass is formed into a spherical or oval preform by firing polishing at a temperature between the flow-point (the viscosity of $10^5$ poises) and yield point (the viscosity of $10^{10}$ poises) of the glass, preferably at the softening point (the viscosity of $10^{7.6}$ poises) of the glass.

3. A spherical or oval preform for molded lenses, which is formed by fire polishing at a temperature between the flow-point (the viscosity of $10^5$ poises) and yield point (the viscosity of $10^{10}$ poises).

4. A method for fabricating a preform for molded lenses, in which a polygonal or substantially spherical form of glass is placed on a heating dish built up of material that is not fused to the glass, and is then heated for fire polishing at a temperature between the flow-point (the viscosity of $10^5$ poises) and yield point (the viscosity of $10^{10}$ poises).

5. A preform for molded lenses, which is fabricated by placing a polygonal or substantially spherical form of glass on a heating dish built up of material that is not fused to the glass, and heating the glass for fire polishing at a temperature between the flow-point (the viscosity of $10^5$ poises) and yield point (the viscosity of $10^{10}$ poises).

6. A method for fabricating a preform for molded lenses, in which a die-like or spherical form of glass is placed on a heating dish made up of material that is not fused to the glass, and is then heated for fire polishing at a temperature between the flow-point (the viscosity of $10^5$ poises) and yield point (the viscosity of $10^{10}$ poises) for a period of time of 10 minutes or more.

7. A preform for molded lenses, which is fabricated by placing a die-like or spherical form of glass on a heating dish built up of material that is not fused to the glass, and heating the glass for fire polishing at a temperature between the flow-point (the viscosity of $10^5$ poises) and yield point (the viscosity of $10^{10}$ poises) for a period of time of 10 minutes or more.

According to the invention, glass 8 (having a roughness of about 400 Å) that is cut and polished in a die-like (FIG. 2(a) or spherical form FIG. 2(b) is placed on a heating dish 6 to which the glass 8 is not fused, and fire-polished by heating for at least 10 minutes at a temperature that is between the yield point ($10^{10}$ poises) and flow-point ($10^5$ poises) of the glass 8.

This heating enables surface asperities of the glass 8 to be reduced, and the surface roughness of the glass 8 to be reduced to 100 Å or less.

Weight control is achieved within the range of 0.5% by pre-cutting or rough-polishing.

Heating should be carried out at a temperature between the yield point ($10^{10}$ poises) and flow-point ($10^5$ poises) of the glass, preferably at a temperature in the vicinity of the softening point ($10^{7.6}$ poises) of the glass.

At less than $10^5$ poises it is difficult to maintain a spherical form of glass, because the glass flows. In addition, there is a great possibility that the glass may be fused to a heating dish 6.

At higher than $10^{10}$ poises some time is needed for fire-polishing and difficulty is involved in obtaining a surface roughness of up to 100 Å.

The heating dish 6 should be made up of material that is not fused to glass, for instance, graphite or $Cr_2O_3$, and have a semi-spherical, concave surface 7 so as to obtain the center position for pressing.

The heating dish 6, esp., the concave surface 7 should have been polished or coated to a surface roughness of 100 Å or less, because the surface roughness is transferred onto the bottom of the preform.

Of course, heating should be carried out in a neutral or reducing atmosphere, when the heating dish 6 is built up of graphite.

BRIEF DESCRIPTION OF THE DRAWINGS

FIG. 3a, 3b and 3c are schematics showing the shape of the final preform obtained by heating a cubic form of glass material, an almost spherical form of glass material on a concavely heating dish, in the final preform shape obtained by heating a spherical form of glass material on a flat heating dish, respectively.

DETAILED EXPLANATION OF THE PREFERRED EMBODIMENTS

Figure 1:
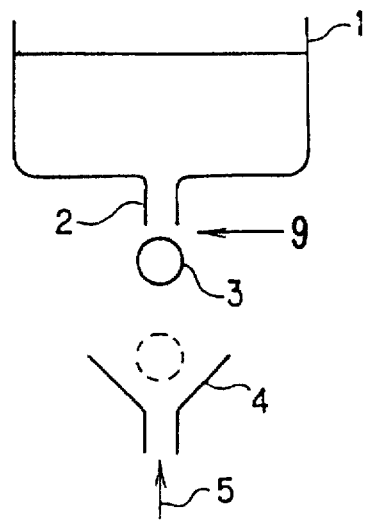
FIG. 1 is a schematic of conventional prefoming apparatus operated by a dropping (glass droplet) method.
Figure 2A:
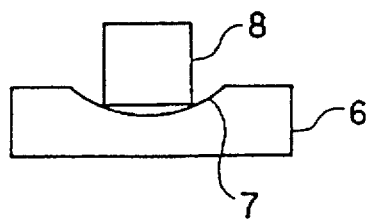
FIG. 2a and 2b are schematics showing the configurations of a heating dish and the shapes of glass material as a cube and sphere, respectively.
Figure 2B:
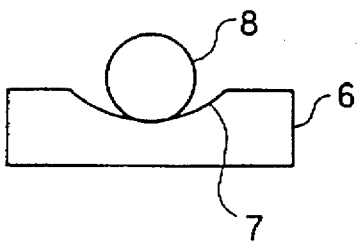

Some preferable examples of the invention will now be explained with reference to typical optical glasses SK5, BK7, LaC10, F2, SF10, and FCD1.

a) SK5

SK5 is a stable glass having a refractive index Nd of 1.589 and an Abbe's number ν of 61.3 and unlikely to receive a chemical attack.

This glass has thermal properties as expressed in term of a transition point Tg of 615° C., an yield point Ts of 650° C. and a softening point $T_{10}^{7.6}$ of 747° C.

This glass was formed into a preform under the following conditions:

This glass having a roughness of 400 Å was formed to prepare a ball or die-like form of specimen, which was in turn placed in a heating graphite dish 6. Then, the dish 6 was heated at 760° C. for 10 minutes in a nitrogen or forming gas atmosphere.

As a result, it was found that the glass specimen is not fused to the dish 6 at a temperature of up to 800° C.

Even at a temperature 10° C. to 20° C. higher than the yield point a roughness of up to 100 Å may be obtained, but the heating time is prolonged. It is thus desired that the heating time be about 10 minutes at the softening point of $10^{7.6}$ poises.

A spherical form of fire-polished surface is obtained by using spherical glass with a heating dish 6 having a spherical surface, as shown in FIG. 3(b).

With a flat plate form of dish 6 shown in FIG. 3(c), a preform with a partly flat bottom is obtained. If once again heated upside down, this takes a spherical form so that the center of pressing can be at a constant location.

When the glass is heated at 800° C. for 1 hours on a heating dish 6 having a round surface 7 (see FIG. 3(a)), a die-like or go stone form of preform is obtained.

b) BK7

Nd: 1.517
ν: 64.2
Tg: 565° C.
Ts: 630° C.
$T_{10}^{7.6}$: 724° C.

This glass was heated on a heating graphite dish 6 in a neutral atmosphere, but was clouded on the surface at 800° C. This is due to surface devitrification. At 730° C., however, a clear fire-polished surface was obtained.

At 730° C., the glass 8 was prone to being fused to a heating dish 6 made up of Pt or $Cr_2O_3$.

c) FCD-1

Nd: 1.497
ν: 81.6
Tg: 455° C.
Ts: 485° C.

FCD-1 is somewhat labile to devitrification, and so $T_{10}^{7.6}$ cannot be measured. However, it has been found that if FCD-1 is heated on a heating graphite dish 6 or an SiC substrate at 600° C. for 10 minutes in a nitrogen gas stream, its roughness is reduced to up to 100 Å with no sign of fusion to the dish 6.

However, it is very difficult to use this glass with SiC, because the interface bubbled up.

d) LaC-10

Nd: 1.720
ν: 50.3
Tg: 620° C.
Ts: 655° C.
$T_{10}^{7.6}$: 696° C.

LaC-10 was heated on a heating graphite dish 6 at the temperature of 710° C. somewhat higher than the softening point for 40 minutes in a nitrogen gas stream. As a result, the surface roughness decreased from 350 Å to 110 Å.

e) F2

Nd: 1.620
ν: 36.3
Tg: 435° C.
Ts: 480° C.
$T_{10}^{7.6}$: 573° C.

Graphite cannot be used for the heating dish 6, because this glass contains $Pb^{2+}$. That is, when heating was carried out in a neutral or reducing atmosphere to avoid the oxidation of graphite, $Pb^{2+}$ was reduced to $Pb^0$, which caused the glass to become grayish black.

For this reason, $Cr_2O_3$ was used for the heating dish 6. F2 is more likely to be fused to a $Cr_2O_3$ substrate than to a graphite substrate. However, when F2 was heated on the $Cr_2O_3$ dish at the temperature of 550° C. somewhat lower than $T_{10}^{7.6}$ for 20 to 30 minutes, a surface roughness of 110 Å was obtained with no sign of fusion to the dish 6.

f) SF10

Nd: 1.728
ν: 28.3
Tg: 460° C.
Ts: 490° C.
$T_{10}^{7.6}$: 587° C.

Graphite cannot be used for the heating dish 6, because SF 10 contains much $Pb^{2+}$.

For this reason, $Cr_2O_3$ is used for a heating dish 6. However, $Cr_2O_3$, because of being an oxide, is likely to react with and stick to glass at high temperature.

For this reason, SF10 was heated at the temperature of 560° C. somewhat lower than the softening point for 20 minutes. As a result, SF10 showed a surface roughness of 100 Å without sticking to the dish 6.

To obtain a fire-polished surface according to the invention, it is thus desired that glass be heated on a heating graphite dish 6 at a temperature expressed by the viscosity of $10^5$ poises to $10^{10}$ poises, preferably the softening point (expressed by the viscosity of $10^{7.6}$ poises) for at least 10 minutes.

Glass stable to devitrification such as BK7 and SK5 can be heated at a temperature that is higher than the softening point and expressed by the viscosity of about $10^5$ poises. Glass such as LaC-10, on the other hand, must be heated at a temperature slightly higher than the softening point (expressed by $10^{7.6}$ poises) for a longer period of time (20 to 40 minutes), because it sticks to the dish 6 at a much higher temperature, whereas it shows a surface roughness exceeding 100 Å at a much lower temperature.

To obtain a fire-polished surface with FCD-1, heating is carried out at up to 600° C. for 10 minutes, because FCD-1 is prone to devitrification.

A heating $Cr_2O_3$ dish 6 is used for glass containing $Pb^{2+}$ such as F2 and SF10, because they react with graphite. To obtain a fire-polished surface with F2 and SF10, heating is carried out at a temperature of up to the softening point (expressed by $10^{7.6}$ poises) for more than 10 minutes (20 to 30 minutes), because F2 and SF10 are more likely to stick to $Cr_2O_3$ than to graphite.

The invention mentioned above has many advantages, among which:

1) A solid form of glass sheet or E-bar can be used with no need of melting.
2) Only heating in an electric furnace is needed.
3) A heating dish can be used over and over by atmosphere control.
4) Mass-production is achievable by carrying a number of dishes through an electric furnace.

That is, the invention dispenses with melting glass, and enables low-cost preforms to be fabricated by cutting or polishing a solid form of glass and heating it on a heating dish.

The invention is also characterized in that every glass can be used to fabricate large preforms. This makes it possible to use more optical glass materials for molded lenses, and so enable molded lenses to have wider application.

What is claimed is:

1. A method for fabricating a preform for a molded lens, consisting essentially of the steps of:

providing a heating dish including an upper concave surface portion, wherein the upper concave surface portion is polished or coated to a surface roughness of 100 Å or less, and wherein the heating dish is comprised of graphite or $Cr_2O_3$.

disposing an optical glass starting material having a surface roughness of 400 Å or less on the upper concave surface portion of the heating dish, provided that the heating dish is comprised of $Cr_2O_3$ if the optical glass starting material contains $Pb^{2+}$ ions, fire polishing by heating the optical glass starting material at a temperature between the yield point and about the softening point of the glass, provided that the fire polishing is conducted in a neutral or reducing atmosphere if the heating dish is comprised of graphite, wherein a preform for a molded lens is obtained having a surface roughness of 100 Å or less.

2. The method according to claim 1, wherein the optical glass starting material is cubic, spherical or polygonal in shape.

3. The method according to claim 1, wherein the fire polishing heat treatment is conducted for at least 10 minutes.

4. The method according to claim 1, wherein the preform for a molded lens is spherical or oval in shape.

5. The method according to claim 1, wherein the optical glass starting material is not fused to the heating dish during the fire polishing heat treatment.

* * * * *